United States Patent [19]

Katchka

[11] Patent Number: 5,620,016
[45] Date of Patent: Apr. 15, 1997

[54] FUEL CONTROL DEVICE, PARTS THEREFOR AND METHODS OF MAKING THE SAME

[75] Inventor: Jay R. Katchka, Cypress, Calif.

[73] Assignee: Robertshaw Controls Company, Richmond, Va.

[21] Appl. No.: 303,157

[22] Filed: Sep. 8, 1994

[51] Int. Cl.⁶ .................................................. F16L 55/18
[52] U.S. Cl. ........................... 137/15; 137/315; 137/335; 126/361; 285/158; 285/382
[58] Field of Search ........................ 285/382, 158; 137/315, 335.15; 126/361

[56] References Cited

U.S. PATENT DOCUMENTS

| | | | |
|---|---|---|---|
| 1,464,406 | 8/1923 | Butler | 285/382 |
| 2,574,625 | 11/1951 | Coss | 285/382 |
| 4,103,937 | 8/1978 | Wakefield | 285/382 |
| 4,770,446 | 9/1988 | Keller | 285/158 |
| 4,872,830 | 10/1989 | Katchka et al. | 431/54 |
| 5,261,438 | 11/1993 | Katchka | 137/15 |

FOREIGN PATENT DOCUMENTS

297122  5/1954  Switzerland ........................... 285/382

*Primary Examiner*—A. Michael Chambers
*Attorney, Agent, or Firm*—Fulbright & Jaworski LLP

[57] ABSTRACT

A fuel control device, parts therefor and methods of making the same are provided, the control device comprising a housing having a shank portion for interconnecting with a spud carried by a hot water tank construction, the shank portion comprising a flange fastened to the housing and a tubular part secured to the flange and having structure for interconnecting with the spud, the tubular part having an end thereof swedged to the flange to secure the tubular part and the flange together.

8 Claims, 5 Drawing Sheets

FUEL CONTROL DEVICE, PARTS THEREFOR AND METHODS OF MAKING THE SAME

BACKGROUND OF THE INVENTION

1. Field of the Invention

This invention relates to a new fuel control device and to a new shank construction therefor as well as to a new method of making such a fuel control device and to a new method of making such a shank construction.

2. Prior Art Statement

It is known to provide a fuel control device comprising a housing means having a shank portion for interconnecting with an opening means of a spud carried by the wall means of a hot water tank construction, the shank portion comprising a flange means fastened to the housing means and a tubular means secured to the flange means and having external means for interconnecting with the opening means of the spud and an internal means for interconnecting to a temperature sensing unit that projects through the opening means and into the tank construction to sense the temperature of the water contained therein, the tubular means having an end thereof welded to the flange means to secure the tubular means and the flange means together.

It is also known to provide a one-piece shank construction for a control device wherein the shank construction has an externally threaded part for threading in the opening means of a spud carried by a hot water tank construction. For example, see the U.S. patent to Katchka et al, U.S. Pat. No. 4,872,830.

It is also known to provide a one-piece shank construction for a fuel control device wherein the shank construction has axial securing means on the tubular portion thereof that is adapted to be axially pushed into the opening means of the spud until the axial securing means is in a predetermined position thereof so as to cooperate with axial securing means of the opening means of the spud to interconnect the fuel control device to the spud. For example, see the U.S. patent to Katchka, U.S. Pat. No. 5,261,438.

SUMMARY OF THE INVENTION

It is one of the features of this invention to provide a new shank construction for a fuel control device wherein the shank construction comprises a flange means to be fastened to the housing means of the fuel control device and a tubular means that is to interconnect with the spud of the hot water tank, the tubular means being uniquely secured to the flange means by a swedging operation.

As previously stated, it is known to have a two-piece shank construction for a fuel control device wherein the tubular means of the shank construction is welded to the flange means thereof.

However, it has been found according to the teachings of this invention that an end means of the tubular means can be so formed that the same is adapted to be swedged to the flange means in a simple and effective manner to interconnect the tubular means and flange means together.

For example, one embodiment of this invention comprises a fuel control device comprising a housing means having a shank portion for interconnecting with an opening means of a spud carried by the wall means of a hot water tank construction, the shank portion comprising a flange means fastened to the housing means and a tubular means secured to the flange means and having external means for interconnecting with the opening means of the spud and internal means for interconnecting to a temperature sensing unit that projects through the opening means and into the tank construction to sense the temperature of the water contained therein, the tubular means having an end thereof swedged to the flange means to secure the tubular means and the flange means together.

Accordingly, it is an object of this invention to provide a new fuel control device having one or more of the novel features of this invention as set forth above or hereinafter shown or described.

Another object of this invention is to provide a new method of making such a fuel control device, the method of this invention having one or more of the novel features of this invention as set forth above or hereinafter shown or described.

Another object of this invention is to provide a new part for such a fuel control device or the like, the part of this invention having one or more of the novel features of this invention as set forth above or hereinafter shown or described.

Another object of this invention is to provide a new method of making such a part, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

While the various features of this invention are hereinafter illustrated and described as being particularly adapted to provide a hot water heater having the fuel control device and the hot water tank construction thereof of particular configurations, it is to be understood that the various features of this invention can be utilized singly or in various combinations thereof to provide other types of hot water heaters as desired.

Therefore, this invention is not to be limited to only the embodiments illustrated in the drawings, because the drawings are merely utilized to illustrate one of the wide variety of uses of this invention.

Figures 1, 2:
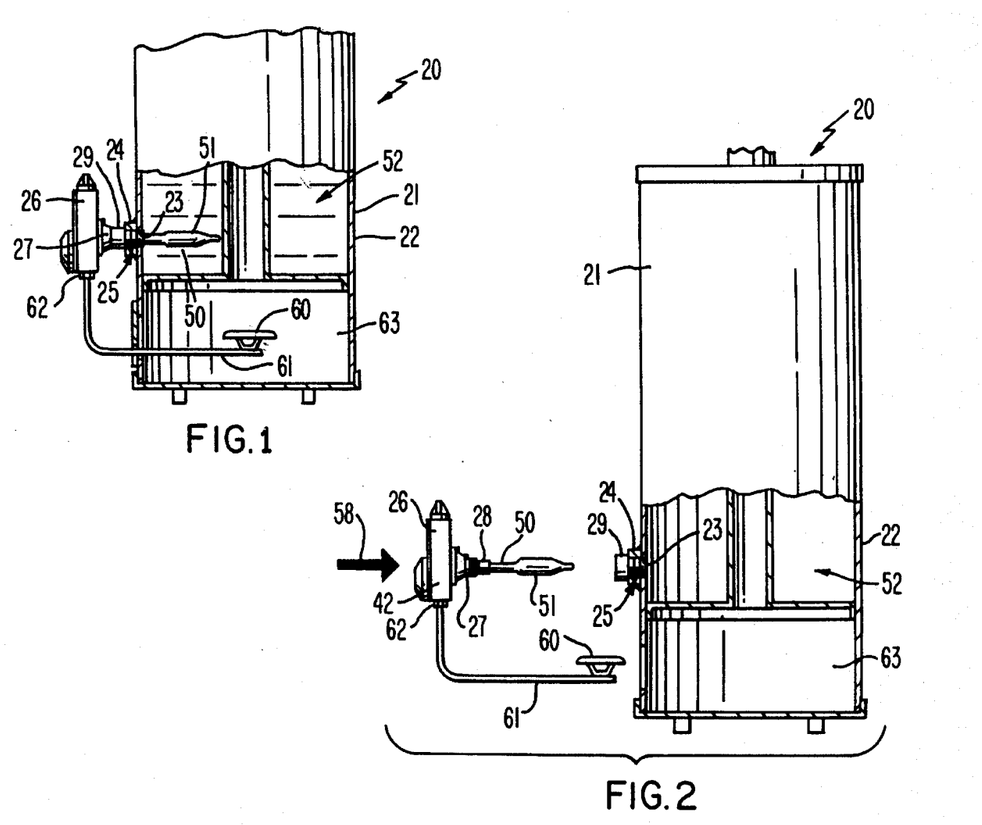
FIG. 1 is a fragmentary schematic view, partially in cross section, illustrating the new fuel control device of this invention interconnected to a hot water tank construction.
FIG. 2 is a view similar to FIG. 1 and illustrates the fuel control device in exploded relation and before the same has been assembled to the hot water tank construction.

Referring now to FIG. 1, a new hot water heater of this invention is generally indicated by the reference numeral 20 and comprises a hot water tank construction 21 having a wall means 22 provided with an opening means 23 therethrough and a spud 24 carried by the wall means 22 and having an opening means therethrough that is generally indicated by the reference numeral 25 and is disposed in aligned relation with the opening 23 of the wall means 22. The water heater 20 also comprises a fuel control device 26 of this invention having a unique shank construction 27 provided with a tubular portion or means 28, FIG. 3, disposed in the opening means 25 of the spud 24 and being interconnected to the opening means 25 so as to be carried by the wall means 22 whereby the entire fuel control device 26 is, thus, carried by the wall means 22.

The particular type of interconnection of the tubular means 28 of the shank portion 27 with the opening means 25 of the spud 24 is of the unique axial push-in type fully disclosed and claimed in the aforementioned U.S. patent to Katchka, U.S. Pat. No. 5,261,438 whereby this U.S. patent is being incorporated into this disclosure by this reference thereto.

Figure 4:
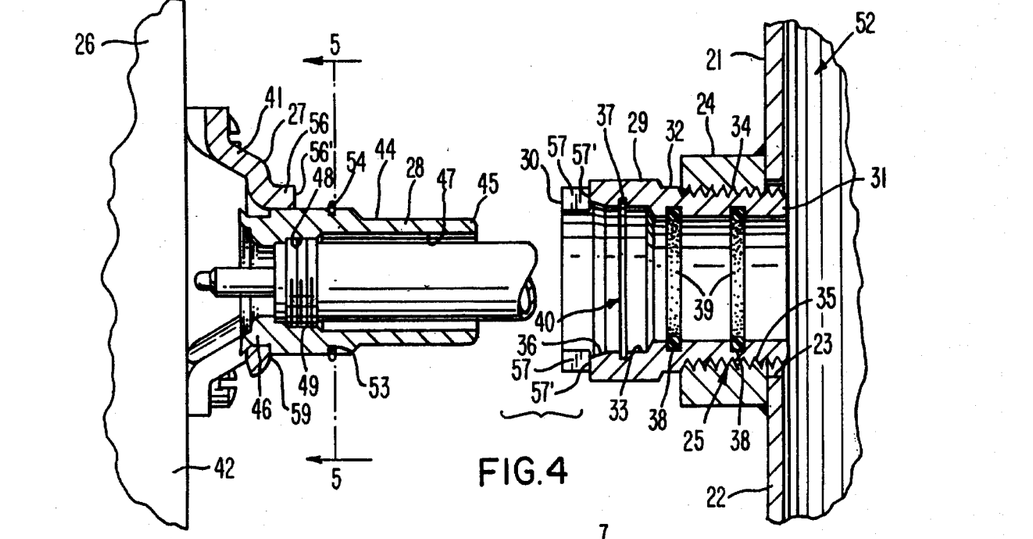
FIG. 4 is a view similar to FIG. 3 and illustrates the fuel control device of this invention before the same is initially assembled in the opening means of the spud of the hot water tank construction of FIG. 1.

The opening means 25 of the spud 24 is best illustrated in FIG. 4 and comprises a shank fitting 29 that comprises a cylinder or tube formed of metallic material and having opposed ends 30 and 31 and having an outer peripheral surface means 32 and internal peripheral surface means 33, the end 31 of the shank fitting 29 having the external peripheral surface means 32 thereof provided with external threads 34 which are adapted to be threaded into an internally threaded opening 35 of the spud 24 so as to be carried thereby as illustrated.

The shank fitting 29 has an internally beveled surface 36 leading to the internal peripheral surface 33 at the end 30 thereof and the internal peripheral surface 33 is interrupted by a first annular groove 37 and a pair of like annular grooves 38 that are disposed spaced from each other, the annular grooves 38 respectively having annular O-ring sealing members 39 disposed therein in a manner well known in the art for O-ring sealing purposes so that portions of the O-rings 39 normally extend radially inwardly beyond the internal peripheral surface means 33 for a sealing function as will be apparent hereinafter.

The annular groove 37 in the shank fitting 29 comprises an axial securing means for the opening means 25 of the spud 24 and is given the reference numeral 40 so as to be hereinafter referred to as the axial securing means 40 for the opening means 25 of the spud 24 or as the axial securing means 40 for the shank fitting 29 as the case may be.

Figure 5:
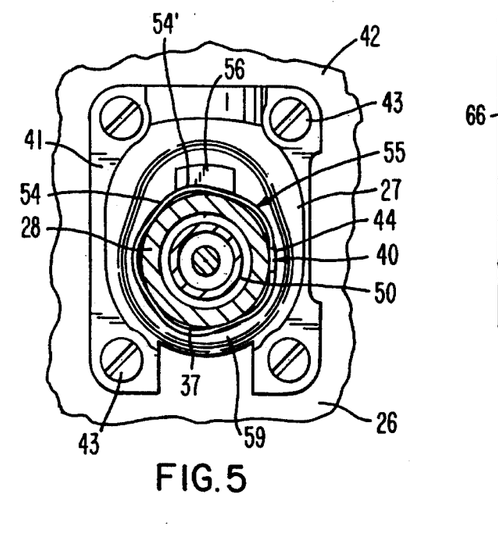
FIG. 5 is a fragmentary cross-sectional view taken on line 5—5 of FIG. 4.

The unique shank construction 27 of this invention for the fuel control device 26 has a flange means 41 that is fastened to a housing means 42 of the fuel control device 26 by threaded fastening members 43, FIG. 5, in a manner conventional in the art and the tubular portion or means 28 of this invention is interconnected to the flange means 41 in a manner hereinafter described so as to project outwardly from the fuel control device 26. The tubular means 28 has an external peripheral surface means 44 and has opposed ends 45 and 46, the tubular means 28 having a stepped opening means 47 passing therethrough and defining an internally threaded portion 48 in which an externally threaded portion 49 of a conventional rod and tube temperature sensing unit 50 is threaded so as to operate the fuel control device 26 in a conventional manner in relation to the temperature being sensed by an enlarged end 51 of the unit 50 that will be disposed in a water containing chamber 52 of the hot water tank construction 21 in a conventional manner when the fuel control device 26 has the tubular portion 28 of the shank construction 27 thereof disposed in the opening means 25 of the spud 24 in a manner hereinafter set forth.

The operation of a fuel control device is well known in the art. For example, see the aforementioned U.S. patent to Katchka et al, U.S. Pat. No. 4,872,830 whereby this patent is being incorporated into this disclosure by this reference thereto. Thus, a further description of the operation of the fuel control device 26 for controlling the heating of the hot water tank construction 21 is not necessary.

The external peripheral surface means 44 of the tubular means 28 of the shank construction 27 of the fuel control device 26 is interrupted by an annular groove 53 in which inner portions of a polygonically-shaped split metallic snap ring 54 are disposed so that outer edge portions 54' of the ring 54 normally extend radially outwardly beyond the outer peripheral surface means 44 of the tubular means 28 through the natural resiliency of the ring 54 in a manner well known in the art. However, the outer edge portions 54' of the ring 54 are adapted to be cammed inwardly into the groove 53 so that the outer peripheral edges 54' of the ring 54 will be substantially coplanar with the surface means 44 of the tubular means 28 as will be apparent hereinafter even though the natural resiliency of the ring 54 is tending to radially outwardly expand the ring 54 to its normal condition illustrated in FIG. 5 wherein the outer peripheral edges 54' of the ring 54 are extending beyond the outer peripheral surface means 44 of the tubular means 28. The ring 54 comprises an axial securing means for the shank construction 27 and is also given the reference numeral 55 so as to be hereinafter referred to as the axial securing means 55 for the shank construction 27 of the fuel control device 26.

Figure 12:
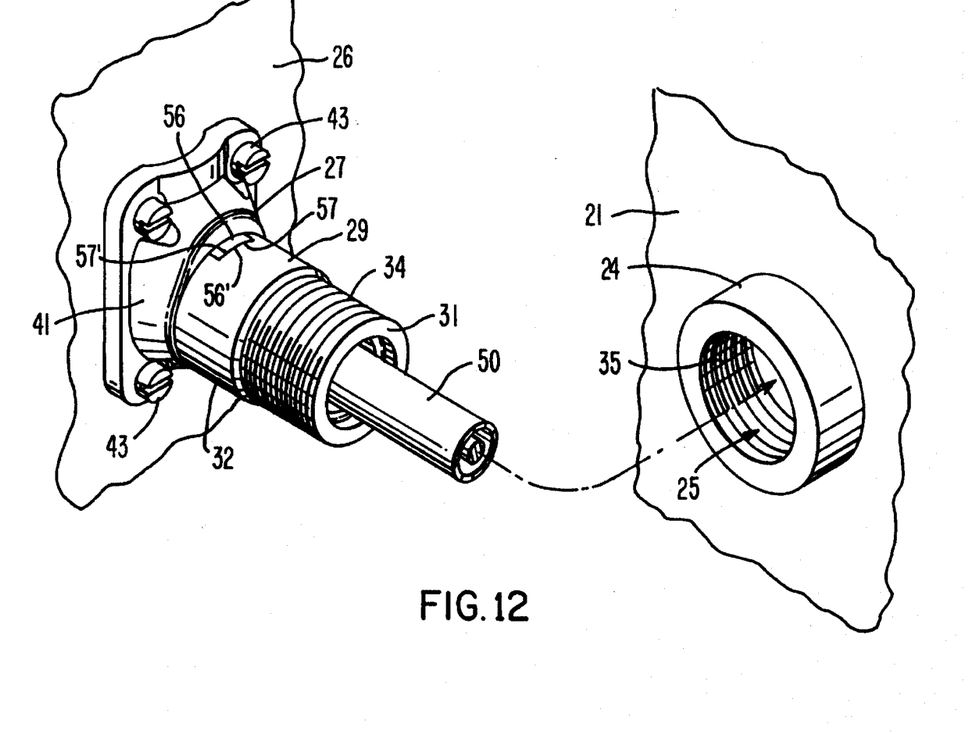
FIG. 12 is an exploded perspective view of the parts illustrated in FIG. 11.

The flange means 41 of the shank portion 27 of the fuel control device 26 has a projection 56 adapted to cooperate with a slot 57 formed in the end 30 of the shank fitting 29 as illustrated in FIG. 12 to rotationally orient the fuel control device 26 with the shank fitting 29, the end 30 of the shank fitting 29 having two such slots 57 disposed 180° relative to each other although only one of the slots 57 cooperates with the projection 56 at any one time as is apparent from the drawings.

From the above, it can be seen that it is a relatively simple method of the invention set forth in the aforementioned U.S. patent to Katchka, U.S. Pat. No. 5,261,438 to form the fuel control device 26 of this invention to have the axial securing means 55 and to form a shank fitting 29 so as to have the axial securing means 40, the axial securing means 55 and 40 cooperating together to effectively interconnect the fuel control device 26 to the opening means 25 of the spud 24 of a hot water tank construction 21 in a unique manner through a simple axial movement of the fuel control valve device 26 relative to the hot water tank construction 21 rather than through a rotary threading motion of the fuel control device 26 relative to the hot water tank construction 21 as in other prior known assembly operations.

In particular, the manufacturer of a hot water tank construction 21 initially threads the shank fitting 29 into the threaded opening 35 of the spud 24 to the position illustrated in FIG. 4 so that the slots 57 in the end 30 of the shank fitting 29 are disposed in vertically aligned relation to subsequently properly rotationally orient the fuel control device 26 thereto.

Figure 3:
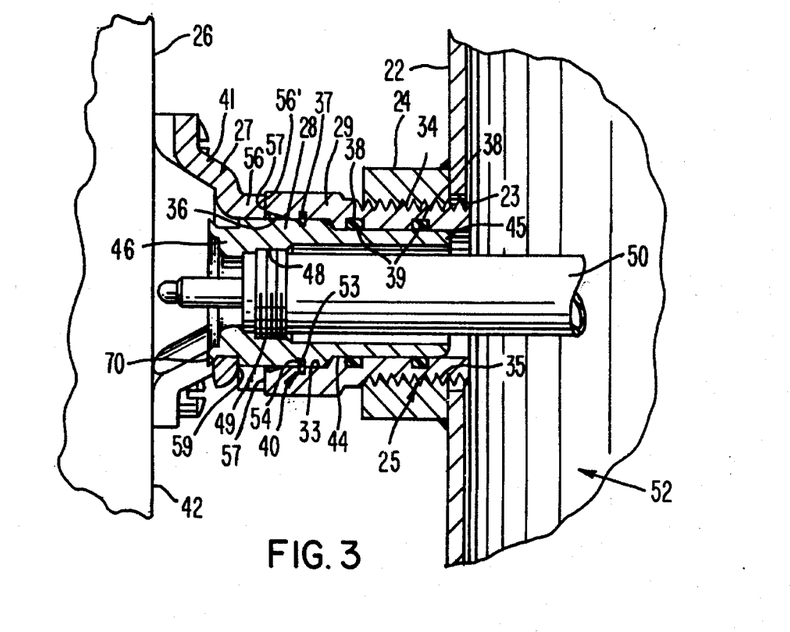
FIG. 3 is an enlarged fragmentary cross-sectional view illustrating the fuel control device of FIG. 1 in its assembled relation with the hot water tank construction of FIG. 1, FIG. 3 being partially in cross section.

Thereafter, the fuel control device 26, together with its temperature sensing unit 50 is assembled to the hot water tank construction 21 by merely axially moving the fuel control device 26 in the direction of the arrow 58 in FIG. 2 so that not only does the temperature sensing unit 50 extend through the opening 33 of the shank fitting 29, through the aligned opening 23 of the wall 22 and into the chamber 52 of the hot water tank construction 21, but also the tubular means 28 of the shank construction 27 of the fuel control device 26 axially enters into the opening 33 of the shank fitting 29 and when the peripheral edges 54' of the ring 54 engage the camming surface 36 at the end 30 of the shank fitting 29, the ring 54 is collapsed into the annular groove 53 of the tubular means 28 to permit the same to clear the opening 33 of the shank fitting 29 and subsequently be axially aligned with the annular groove 37 thereof so that the ring 54 can radially outwardly expand through the natural resiliency thereof to become locked in the annular groove 37 and thereby interconnect the shank construction 27 to the opening means 25 of the spud 24 as fully illustrated in FIG. 3. At the same time that the ring 54 expands radially outwardly into the groove 37 of the shank fitting 29, the projection 56 of the shank construction 27 is received in the cooperating slot 57 of the shank fitting 29 whereby the fuel control valve device 26 is now fully interconnected to the hot water tank construction 21 in its operating position therewith.

Also, it can be seen that the orienting slot 57 of the shank fitting 29 requires vertical alignment of the projection 56 of the shank construction 27 so that the fuel control device 26 is properly rotationally oriented relative to the wall means 22 of the hot water tank construction 21.

During such assembly step of axially inserting the shank construction 27 of the fuel control device 26 into the opening 33 of the shank fitting 29, the O-ring sealing members 39 seal against the outer peripheral surface means 44 of the tubular means 28 to prevent leakage of water out of the chamber 52 at the opening means 25 of the spud 24 in a manner well known in the O-ring sealing art.

While it is preferred to have the axial securing means 55 of the shank construction 27 fully aligned with the axial securing means 40 of the shank fitting 29 before an end surface 56' of the projection 56 of the shank construction 27 engages against the cooperating closed end 57' of the slot 57 of the shank fitting 29 and/or before the end 30 of the shank fitting 29 abuts against a surface 59 of the flange means 41 of the shank construction 27 so as to permit slight over travel of the shank construction 27 into the shank fitting 29, it is to be understood that such bottoming out of one or more surfaces on the shank construction 27 and the shank fitting 29 could take place at the same time the snap ring 54 of the shank construction 27 is aligned with the groove 37 of the shank fitting 29 as the width of the groove 37 can be so selected that the split ring 54 will be aligned with a sufficient amount of the groove 37 to permit interlocking therewith so that the tolerance takeup could be provided by the width of the groove 37 rather than assuring that the surfaces of the shank construction 27 and the shank fitting 29 do not bottom out before there is full alignment of the ring 54 with the groove 37.

Since the fuel control device 26 of this invention is merely axially pushed in place in the shank fitting 29 in the manner previously set forth and is not required to be rotated as in the prior known threading operations, various conduit means can be interconnected to the housing means 42 of the fuel control device 26 before the same is assembled to the hot water tank construction 21. For example, it can be seen in FIG. 2 that a burner means 60 for the hot water tank construction 21 has its fuel feeding conduit means 61 interconnected to an outlet coupling 62 of the fuel control device 26 prior to the fuel control device 26 being assembled with the hot water tank construction 21. In this manner, the fuel control device 26 can be tested with the burner means 60 at a place remote from the hot water tank construction 21 so as to assure that the fuel control device 26 and/or burner means 60 are operating properly before the same are assembled to the tank construction 21. Of course, the pilot burner means and its feeding conduit means as well as thermocouple means for the burner means 60 can also be preassembled to the fuel control device 26 in a like manner and for a like purpose even though such structure is not illustrated in FIGS. 1 and 2.

Thus, it can be seen from FIGS. 1 and 2 that as the fuel control device 26 is axially moved into the opening means 25 of the spud 24, the burner means 60 and its fuel feeding conduit means 61 are axially moved therewith into a proper position thereof in a heating chamber 63 of the tank construction 21.

In this manner, it can be seen that the method for making the water heater 20 permits a manufacturer to thread the shank fittings 29 in the threaded openings 35 of the spuds 24 of the water heater tank constructions 21 until the same are disposed in the predetermined positions thereof wherein the slots 57 are disposed substantially in vertically aligned relation and thereafter, readily assemble the fuel control devices 26 thereto by merely pushing axially inwardly on such fuel control devices 26 into the respective shank fittings 29 until the axial securing means 55 of the fuel control devices 26 align with the axial securing means 40 of the shank fittings 29 to positively interconnect the fuel control devices 26 to the wall means 22 of the respective tank constructions 21 to form the water heaters 20.

Figure 10:
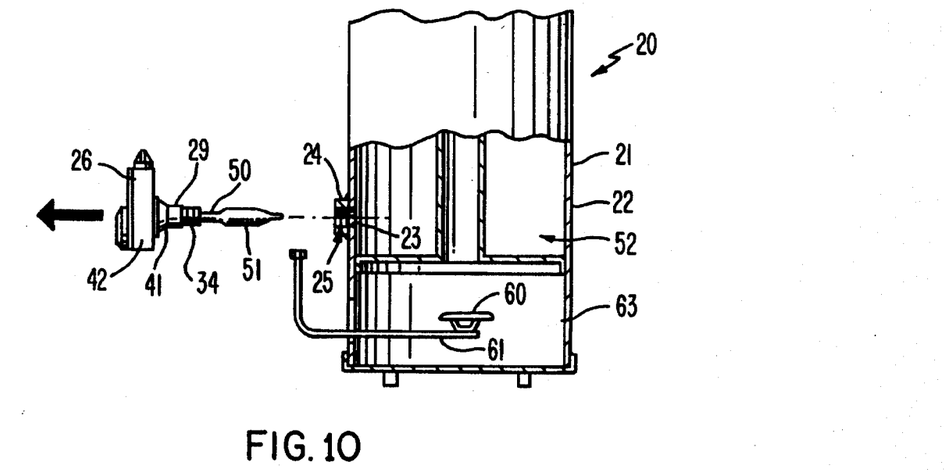
FIG. 10 is a view similar to FIG. 1 and illustrates how the fuel control device of this invention can be removed from the hot water tank construction after the same had been initially assembled thereto.

When it is desired to disassemble a fuel control device 26 from its hot water tank construction 21, such as in the field wherein the initially installed fuel control device 26 needs to be replaced with a like fuel control device 26 or other similar unit, the service personnel disconnects all the conduit means, etc. that are interconnected to the housing means 42 of the fuel control device 26 as illustrated in FIG. 10. In this manner, the fuel control device 26 is now adapted to be removed in a normal manner and the service person rotates the housing means 42 so as to unthread that fuel control device 26 from the threaded opening 35 of the spud 24, the shank construction 27 through the driving relation of the projection 56 of the flange means 41 in the cooperating slot 57 of the shank fitting 29 as illustrated in FIG. 11 unthreads the shank fitting 29 therewith from the threaded opening 35 of the spud 24 whereby the removed fuel control device 26 is in the condition illustrated in FIGS. 11 and 12.

Figure 11:
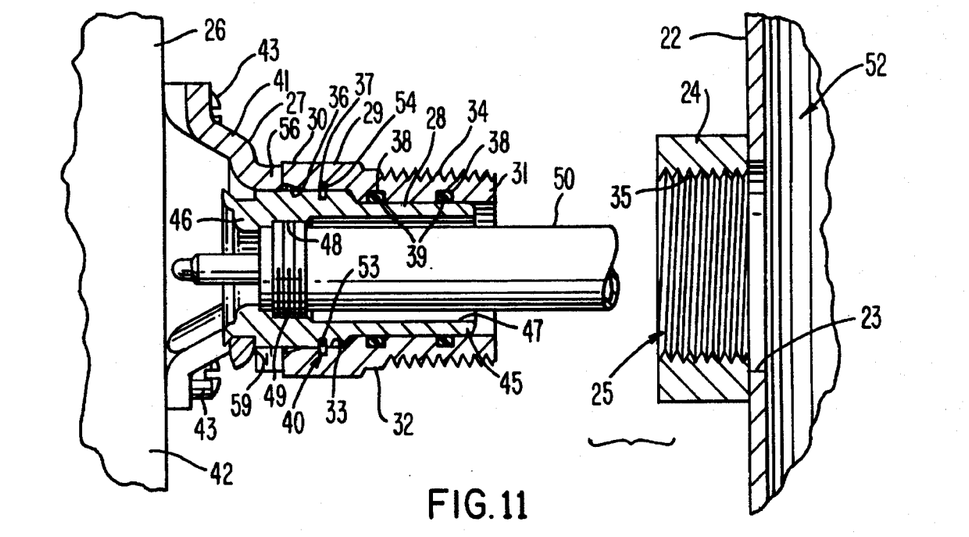
FIG. 11 is a view similar to FIG. 4 and illustrates the fuel control device having been removed from the opening means of the spud of the hot water tank construction or a replacement fuel control device that is to be subsequently disposed in the opening means of a hot water tank construction that is being repaired in the field.

Thus, that service person would then thread the threaded portion of a conventional fuel control valve unit or thread a fuel control valve device 26 of this invention that has the shank fitting 29 assembled thereto in the manner illustrated in FIG. 11 back into the threaded opening 35 of the spud 24 as in the prior known threading operation by rotating the fuel control valve device 26 or other unit.

Of course, if that service person is given a replacement fuel control valve device 26 and its shank fitting 29 being separate therefrom, that service person has the option of either threading the shank fitting 29 into the threaded opening 35 of the spud 24 and thereafter axially inserting the shank construction 27 of the new control valve device 26 therein in the manner illustrated in FIG. 2 or assembling that shank fitting 29 to the shank construction 27 of the new fuel control device 26 as illustrated in FIGS. 11 and 12 before threading the interconnected shank fitting 29 into the threaded opening 35 of the spud 24.

In any event, it can be seen that a service person who is not familiar with the initial assembly operation of the fuel control devices 26 with the hot water tank constructions 21 during the initial manufacturing stage thereof, will remove a fuel control valve device 26 in the field in exactly the same manner that that service person would have removed a prior known fuel control device from a hot water tank in order to replace the same with a new fuel control valve device in the old manner.

As previously stated, one of the features of this invention is to uniquely interconnect the tubular means 28 to a flange means 41 to form the shank construction 27 of this invention so as to operate in the manner previously set forth.

Figure 6:
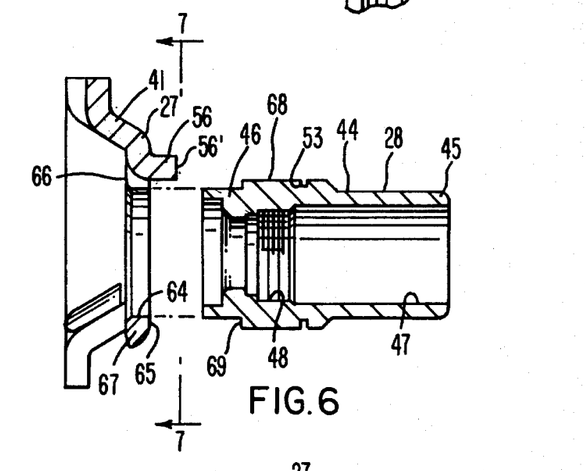
FIG. 6 is an exploded cross-sectional view of certain parts of the new shank construction of this invention that form the new fuel control device of this invention illustrated in FIGS. 1–5.
Figure 7:
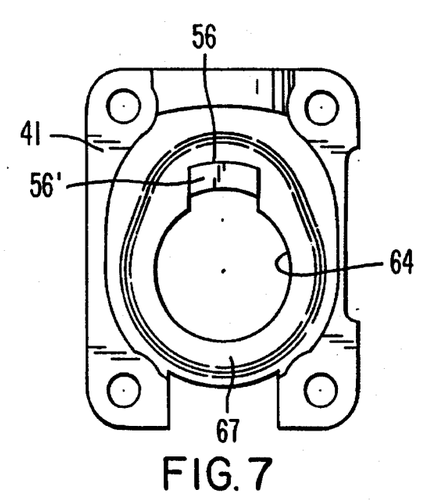
FIG. 7 is a front view of the flange means of the shank construction of this invention and is taken in the direction of the arrows 7—7 of FIG. 6.

Accordingly, reference is now made to FIGS. 6 and 7 wherein it can be seen that the flange means 41 has an opening means 64 passing through opposed sides 65 and 66 of a portion 67 thereof with those opposed sides 65 and 66 being substantially flat.

The end 46 of the tubular means 28 cooperates with a larger diameter intermediate portion 68 thereof to define an annular flat shoulder 69 that is adapted to abut against the surface 65 of the flange means 41 when the end 46 is fully inserted through the opening 64 of the flange means 41, the end 46 projecting beyond the surface 66 when the shoulder 69 of the tubular means 28 abuts against the side 65 of the portion 67 of the flange means 41.

Figure 8:
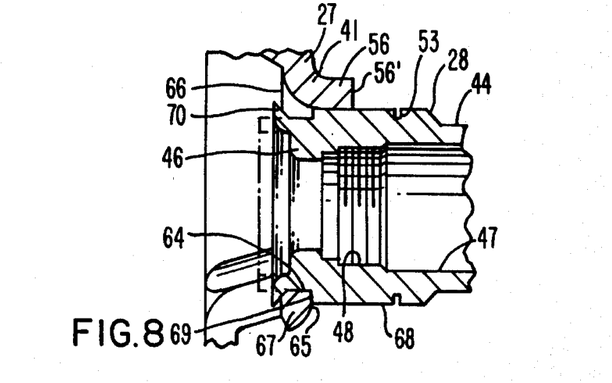
FIG. 8 is a fragmentary view similar to FIG. 6 and illustrates the tubular means of the shank construction of this invention in its assembled and secured condition with the flange means thereof.
Figure 9:
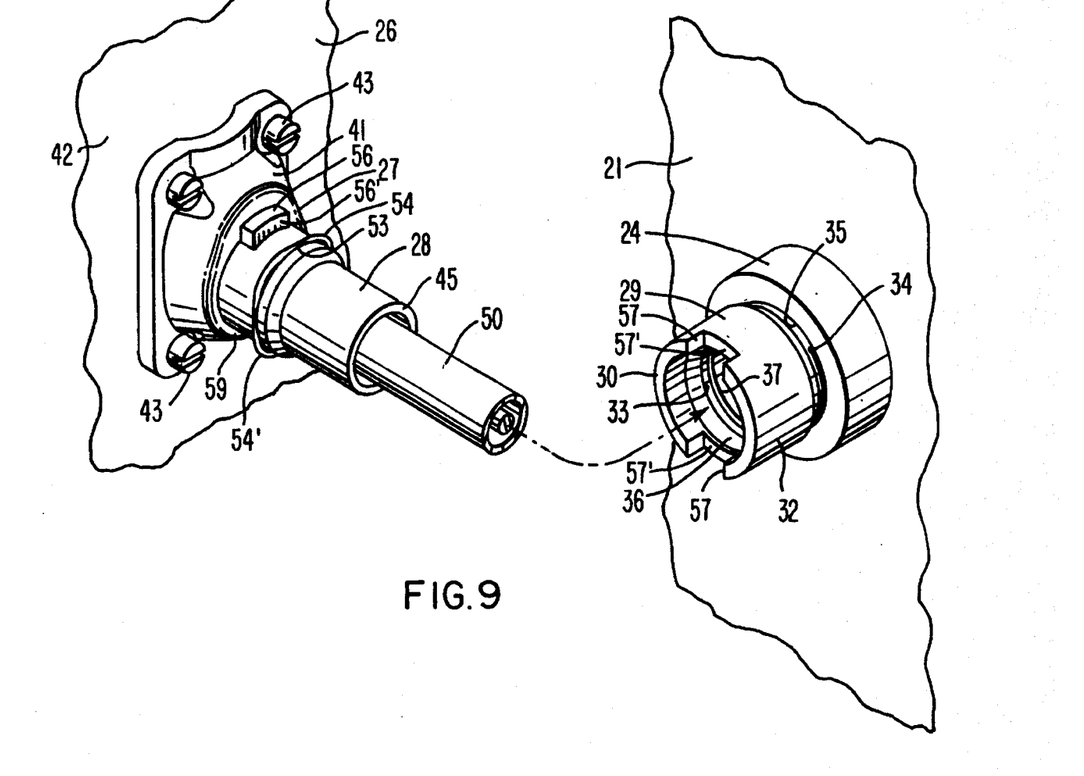
FIG. 9 is an exploded perspective view of the parts illustrated in FIG. 4.

Thereafter, the end 46 is swedged against the surface 66 of the flange means 41 to positively hold or secure the tubular means 28 to the flange means 41. For example, the end 46 of the tubular means 28 can be turned over and rolled against the surface 66 of the portion 67 of the flange means 41 by any suitable rolling or swedging apparatus so that the turned over portion 70 of the end 46 of the tubular means 28 is pressed against the side 66 of the flange means 41 while the shoulder means 69 of the tubular means 28 is in full engagement with the flat surface 65 of the flange means 41 as illustrated in FIG. 8.

Thus, it can be seen that it is a relatively simple method of this invention to interconnect a tubular means 28 to a flange means 41 to form the shank construction 27 of this invention.

While the tubular portion 28 has been previously described as having the axial securing means 55 for permitting the same to be secured to a shank fitting 29 by a simple axial push-in operation as previously described, it is to be understood that the tubular member 28 could be properly sized and be provided with external threads which would cooperate with internal threads 35 of a spud 24 by rotating the fuel control device having such external thread means on the shank portion thereof in the prior known threading operation.

However, it is believed according to the teachings of this invention that it would be desirable to provide a mechanical interlocking of the tubular means with the flange means 41 during the swedging operation so as to assure nonrotational movement between the tubular means and the flange means during such threading operation.

Figure 13:
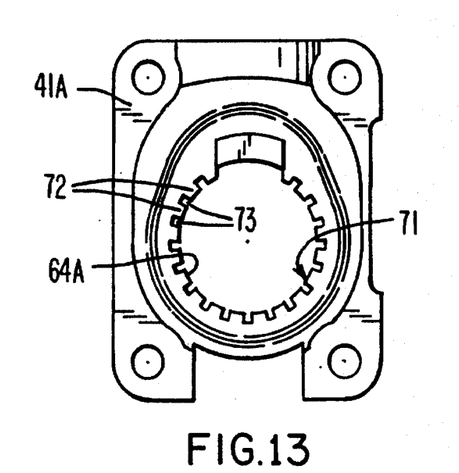
FIG. 13 is a front view of another embodiment of the flange means of the shank construction of this invention and is similar to FIG. 7.
Figure 14:
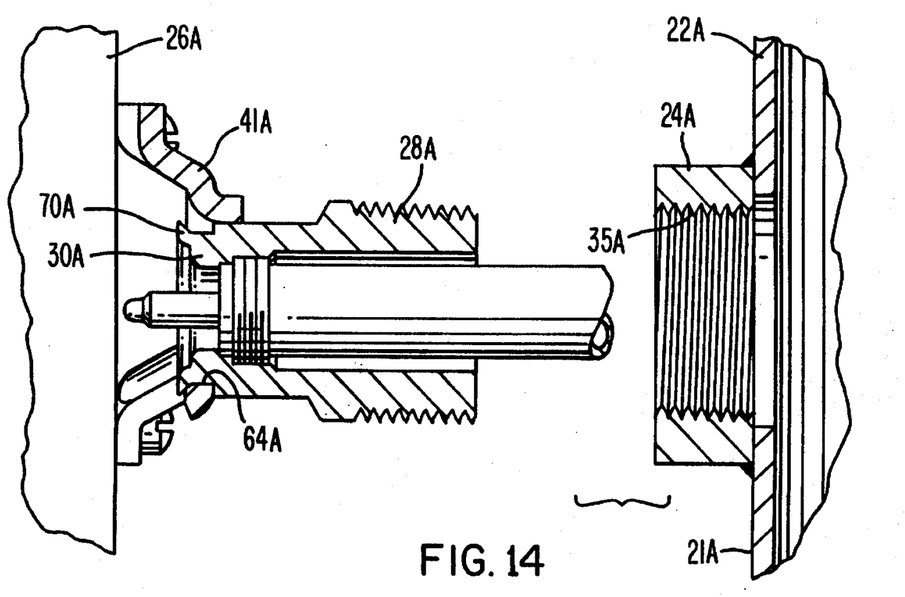
FIG. 14 is a view similar to FIG. 11 and illustrates how another embodiment of the fuel control device of this invention that utilizes the flange means of FIG. 13 and another embodiment of the tubular means as illustrated in FIG. 14 is to be assembled to the spud of a hot water tank construction.

For example, reference is now made to FIGS. 13 and 14 wherein another fuel control device of this invention is generally indicated by the reference numeral 26A and parts thereof similar to the parts of the fuel control device 26 and hot water tank construction 20 are indicated by like reference numerals followed by the reference letter "A".

As illustrated in FIG. 13, it can be seen that the flange means 41A has the opening 64A that is formed therethrough being provided with a castellating arrangement that is generally indicated by the reference numeral 71 and comprising a plurality of projections 72 extending radially into the opening 64A and having recesses 73 therebetween so that when the cooperating end 46A of a tubular means 28A is being swedged into position to form the turned over portion 70A thereof in the manner previously described, parts of the tubular means 28A enter into the recesses 73 of the castellating portion 71 of the flange means 41A to mechanically interlock therewith and thereby prevent rotational movement between the tubular means 28A and flange means 41A.

While the tubular means 28A that is attached to the flange means 41A in the manner previously described could have the axial securing means 55 thereon so as to operate in the same manner as the shank construction 27 as previously described, the particular tubular means 28A illustrated in FIG. 10 has an externally threaded portion 74 for directly threading into the internal threads 35A of a spud 24A mounted to the wall 22A of a hot water tank construction 21A in a conventional manner by having the fuel control device 26A rotated in the proper direction to provide such threading operation.

While the shank construction 27 previously described can be formed of any suitable material, one working embodiment thereof has the flange means 41 stamped from hot roll steel which is approximately 0.1345 of an inch thick before stamping thereof and the opening 64 formed therethrough has a diameter of approximately 0.730 of an inch.

Such one working embodiment has the tubular means 28 formed of No. 360 half hard brass with the intermediate portion 68 thereof having a diameter of approximately 0.827 of an inch while the end 30 has a diameter of approximately 0.725 of an inch. The annular groove 44 of the tubular means 28 is approximately 0.040 of an inch wide.

Such one working embodiment of the tubular shank fitting 29 is also formed from No. 360 half hard brass that is approximately 1⅛" in diameter and the annular groove 37 thereof has a width of approximately 0.035 of an inch.

However, it is to be understood that the dimensions and materials set forth above for the one working embodiment of this invention could be any suitable dimensions and any suitable materials.

Thus, it can be seen that this invention not only provides a new fuel control device and a new method of making the same, but also this invention provides a new part for such a fuel control device and a new method of making such a new part.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. A method of making a hot water tank, comprising the steps of:

providing a tank housing, said tank housing including an opening therethrough;

attaching a spud to said tank housing about said opening;

engaging an annular shank fitting to said spud, said shank fitting including a tab receiving opening;

securing one end of a tubular means into an opening in a flange means, said flange means having a tab extending therefrom, said securing step involving swedging said one end of said tubular means to said flange means;

attaching said flange means to a housing means;

engaging a temperature control means within said tubular means;

inserting a portion of said tubular means opposite said one end means in said annular shank fitting, said inserting step positioning said temperature control means within said tank housing;

positioning said tab in said tab receiving opening; and securing said tubular means to said annular shank fitting.

2. A fuel control device comprising:

a housing means;

a shank portion extending from said housing means;

said shank portion including a flange means having an opening therethrough and a separate tubular means;

said flange means opening having anti-rotation means therein;

one end of said tubular means being swedged to said flange means and being locked by said anti-rotation means to prevent rotation of said tubular means relative to said flange means, wherein said anti-rotation means includes a plurality of projections extending into said opening of said flange means, said projections forming openings therebetween, and wherein said tubular end means having an annular end part and portions of said annular end part being received in said openings formed between said projections thereby preventing rotation of said flange means relative to said tubular means.

3. A hot water tank construction, comprising:

a tank housing, said tank housing including an opening therethrough;

a spud attached to said tank housing about said opening;

an annular shank fitting engaged to said spud and including an annular groove and a tab receiving opening; and a fuel control housing means;

a shank portion extending from said housing means, said shank portion including a flange means having a tab extending therefrom and a separate tubular means having an external surface containing an annular groove, one end of said tubular means being swedged to said flange means and a portion of said tubular means opposite said one end means being disposed in said annular shank fitting and said tab being received in said tab receiving opening;

a split-retaining ring positioned in said external surface annular groove and engaging said shank fitting annular groove; and temperature control means engaged within said tubular means and extending through said opening of said tank housing.

4. The hot water tank of claim 3, wherein said flange means has an opening therethrough, said opening having anti-rotation means therein, and said one end of said tubular means is locked by said anti-rotation means to said flange means to prevent rotation of said tubular means relative to said flange means.

5. The hot water tank of claim 3, wherein said one end of said tubular means has an annular end part and is swedged to said flange means throughout a major portion of said annular end part thereof.

6. The hot water tank of claim 5, wherein said annular end part is turned radially outwardly and against said flange means.

7. The hot water tank of claim 6, wherein said annular end part is turned radially outwardly and against said flange means by a rolling operation.

8. The hot water tank of claim 3, wherein said external surface of said tubular means has external threads for connecting with said shank fitting.

* * * * *